(12) United States Patent
Sahr et al.

(10) Patent No.: US 6,899,617 B2
(45) Date of Patent: May 31, 2005

(54) CLEANING FAN DRIVE

(75) Inventors: Andrew Sahr, Geneseo, IL (US); Kevin S. Schwinn, Orion, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/620,410

(22) Filed: Jul. 15, 2003

(65) Prior Publication Data

US 2005/0020331 A1 Jan. 27, 2005

(51) Int. Cl.[7] .......................... A01D 17/02; A01F 12/46
(52) U.S. Cl. ........................................ 460/114; 460/100
(58) Field of Search ................................. 460/114, 117, 460/111, 902, 97, 98, 99, 100

(56) References Cited

U.S. PATENT DOCUMENTS

| | | | | |
|---|---|---|---|---|
| 3,760,654 A | * | 9/1973 | Fisher | 74/661 |
| 5,033,988 A | * | 7/1991 | McGuire et al. | 464/69 |
| 5,480,353 A | * | 1/1996 | Garza, Jr. | 460/148 |
| 5,778,832 A | * | 7/1998 | King et al. | 123/2 |

* cited by examiner

Primary Examiner—Árpád Fábián Kovács
(74) Attorney, Agent, or Firm—Brant T. Maurer; Rebecca Henkel

(57) ABSTRACT

A drive for a cleaning fan of an agricultural combine that provides resilient flexibility in connection to a structural element of the combine and/or to the fan for correcting or allowing angular misalignment and axial movement between an output of the drive and the fan input. In one embodiment the drive includes a resiliently flexible member connecting the output of the motor in rotatably driving relation to the rotatable input of the fan, the flexible member having sufficient resiliently flexibility so as to allow limited variations in relative angular orientation and axial spacing between the input and the output. In another embodiment a mounting element for mounting the motor to the structural element includes a resiliently flexible member for supporting and holding the motor in alignment with the fan while allowing a limited amount of relative axial and angular movement therebetween. As an advantage of the present invention, angular misalignment and axial displacement between the output of the motor and the fan shaft is compensated for and/or corrected, both during initial assembly and during operation.

12 Claims, 3 Drawing Sheets

CLEANING FAN DRIVE

TECHNICAL FIELD

This invention relates generally to a drive for a cleaning fan of an agricultural combine, and more particularly, to a cleaning fan drive mountable to a frame of the combine supporting the cleaning fan, which provides sufficient alignment between a rotatable output of the drive and the fan, or sufficient flexibility therebetween, such that when structural tolerances and distortions cause angular misalignment and axial displacement between the drive and the fan, damaging stresses and other problems in the drive are avoided.

BACKGROUND

Commonly, drives for cleaning fans of agricultural combines are mounted to frames that support both the drive and the cleaning fan. However, some frames, particularly self-leveling frames, are welded assemblies wherein as a result of individual part tolerances and weld distortions, it is initially difficult to accommodate good alignment between a rotatable output of the drive, which can be an output shaft of a hydraulic motor or the like, and a rotatable input of the cleaning fan, which is typically also a shaft. Angular misalignment between the drive output and fan input can cause high stresses in the output shaft and contribute to premature shaft breakage, seal failure, and increased joint wear between the output and the fan input. In a self-leveling frame, the problem is compounded because to provide the self-leveling capability, the frame, drive and fan are jointly movable within and relative to the combine such that angular misalignment and axial movement between the input and output can develop or increase during operation.

Thus, what is sought is a drive for a cleaning fan of an agricultural combine which overcomes many of the problems and shortcomings discussed

SUMMARY

What is disclosed is a drive for a cleaning fan of an agricultural combine which overcomes many of the problems and shortcomings set forth above. According to one aspect of the invention, the drive and the fan are supported by a frame member or structural element of the combine or the cleaning system and the fan includes an input rotatable about an axis therethrough. The drive includes a motor including an output rotatable about an axis therethrough, and a mounting element for mounting the motor to the frame member or element such that the output is in axial end-to-end relation the input of the fan. The drive further includes a resiliently flexible member connecting the output of the motor in rotatably driving relation to the rotatable input of the fan, the flexible member having sufficient resiliently flexibility so as to allow limited variations in relative angular orientation and axial spacing between the input and the output.

According to another aspect of the invention, the motor includes an output rotatable about a first axis therethrough, the output being connectable in rotatably driving relation to the input of a cleaning fan rotatable about a second axis therethrough. The invention utilizes a mounting element for mounting the motor to the frame member, including a resiliently flexible member for supporting and holding the motor such that the first axis will be substantially aligned with the second axis when the output is rotatably drivingly connected to the input, the resilient flexibility of the mounting element allowing a limited amount of relative axial and angular movement between the output and the input.

As an advantage of the present invention, angular misalignment and axial displacement between the output of the motor and the fan shaft is compensated for and/or corrected, both during initial assembly and during operation. As a result, stress on the motor output is reduced, resulting in improved motor life and reliability.

DETAILED DESCRIPTION OF THE PREFERRED EMBODIMENTS

Figure 1:
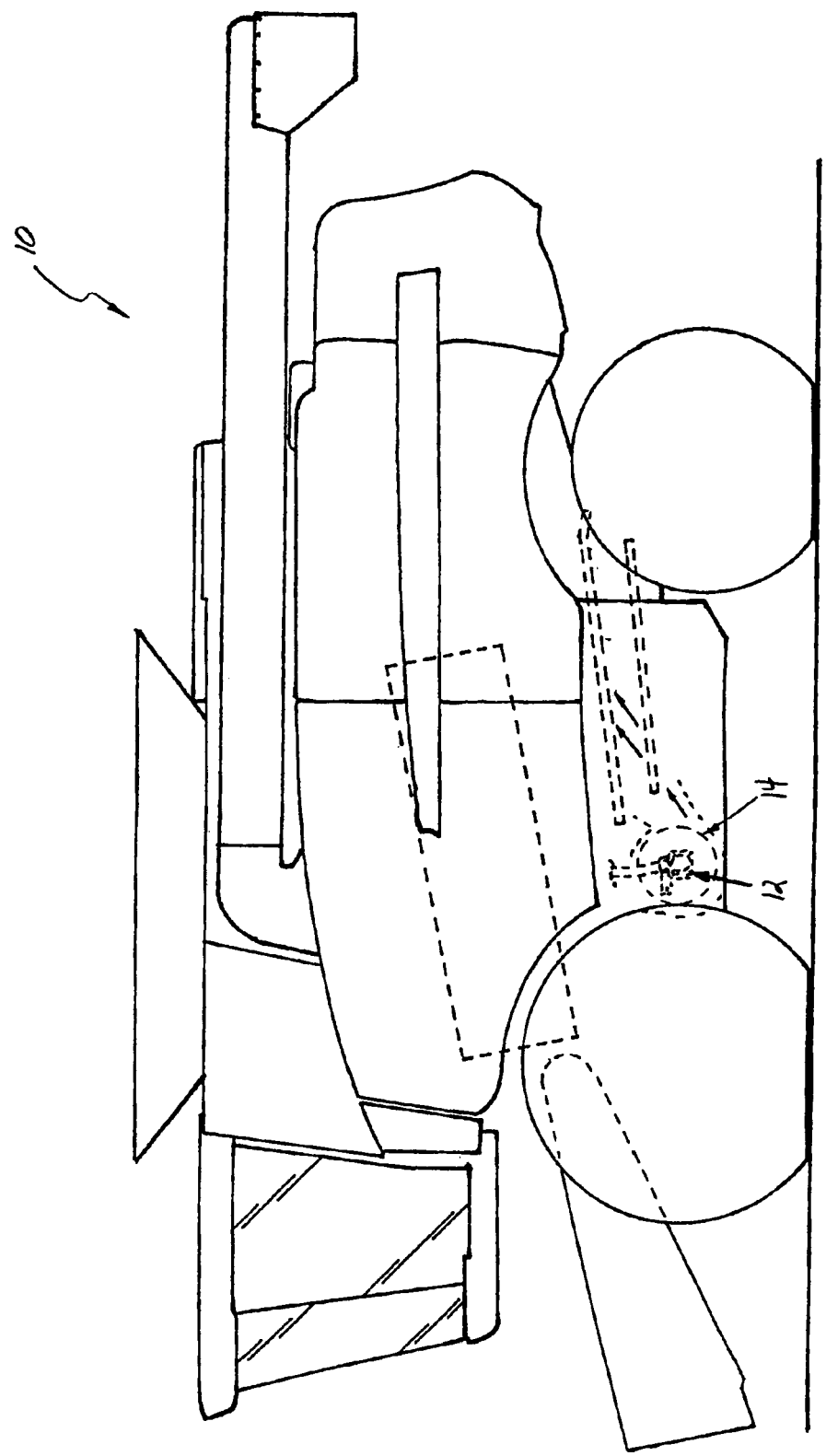
FIG. 1 is a simplified side elevational view of an agricultural combine, showing generally the location of a cleaning fan drive according to the present invention.

Referring now to the drawings, in FIG. 1, an agricultural combine 10 is shown including a cleaning fan drive 12 constructed and operable according to the teachings of the present invention, for rotatably driving a cleaning fan 14 for blowing a flow of air upwardly through sieves of a cleaning system of combine 10 for separating material other than grain from grain harvested by combine 10 in the well known manner.

Figure 2:
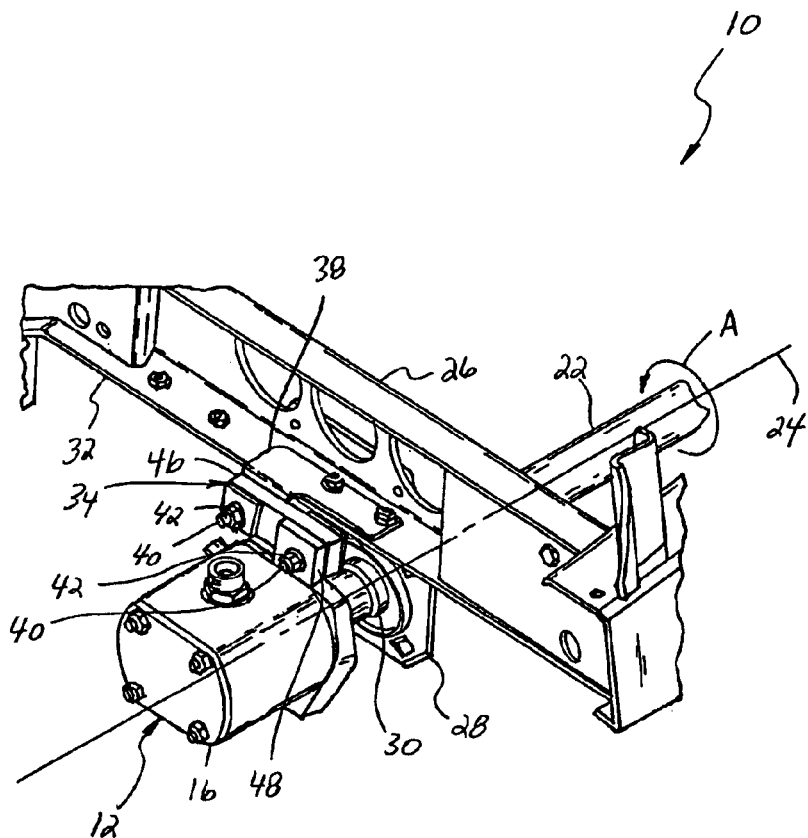
FIG. 2 is a fragmentary perspective view of a cleaning fan drive according to the invention, connected to a cleaning fan shaft, and supported from a frame member of the combine by a mounting element of the invention.
Figure 3:
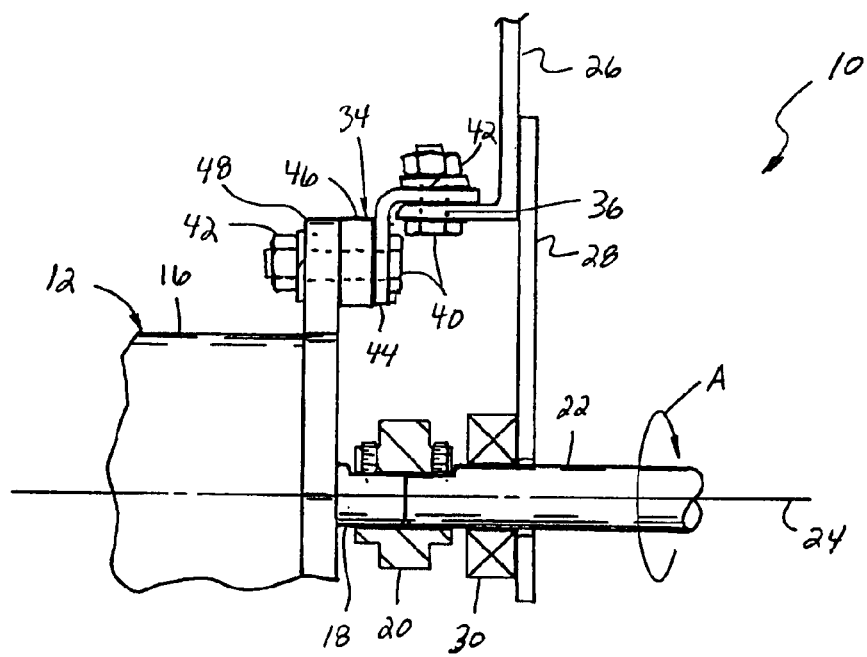
FIG. 3 is an enlarged fragmentary side view of the drive of FIG. 2.

Referring also to FIGS. 2 and 3, drive 12 includes a motor 16 which is preferably a fluid motor connectable by fluid lines to a source of pressurized fluid, such as a fluid pump or the like (not shown), operable for rotatably driving an output 18 of motor 16, which can be, for instance, a shaft. Output 18 is connectable by a conventional coupler 20 in rotatably driving relation to an input 22 of fan 14 about a rotational axis 24, as denoted by arrows A. Both motor 16 and fan shaft 22 are mounted to and supported by a frame member 26 of combine 10, frame member 26 optionally being a part of a self-leveling frame assembly, as desired. A bearing hanger bracket 28 of sheet metal or other suitable material is connected in a suitable manner, such as by welding or the like, to frame member 26 so as to extend downwardly therefrom and supports a suitable bearing 30, which can be a common, commercially available spherical ball bearing or the like, which receives and supports the end of fan input 22 in the position shown. Frame member 26 will typically also be fabricated from sheet metal, and have an L or channel sectional shape, including an elongate, generally horizontally extending lower flange 32. Frame member 26 can be fixedly positioned within combine 10, or movable as part of a self-leveling frame assembly about a pivot point for supporting the cleaning system of combine 10 substantially horizontally when viewed from either end of combine 10, while combine 10 itself is oriented at an angle to horizontal, as a result of being located on a side of a hill or the like.

Cleaning fan drive 12 is mounted to and supported from frame member 26 by a resiliently flexible mounting element 34. Resiliently flexible mounting element 34 prevents rotation of motor 16 relative to frame member 26, while allowing some limited variability in the relative positions of mounting holes 36 through lower flange 32 and bearing 30, such that undesirable stresses are not applied against output 18 of motor 16 so as to damage or shorten the life of motor 16, particularly output 18 and seals therearound. In this regard, mounting element 34 includes an L shape bracket 38 that mounts to flange 32 using suitable bolts 40 and nuts 42 such that a leg 44 of bracket 38 extends downwardly below flange 32. Mounting element 34 includes an elongate, generally horizontally extending resiliently flexible member 46 having one end thereof fixedly mounted to leg 44 by a suitable fastener or fasteners, such as a bolt 40 and nut 42, and an opposite end connected to a flange 48 of motor 16, also by a suitable fastener or fasteners, such as a bolt 40 therethrough secured in position by a nut 42. Resiliently flexible member 46 has an extent in the axial direction which is less than its radial extent, such that some limited axial movement of motor 16 relative to fan input 22 is allowed, while relative rotational movement therebetween is greatly limited. Also, some variance in the relative positions of bearing 30 and mounting holes 36 is permitted, as mounting element 34 allows output 18 of motor 16 to be closely aligned with rotational axis 24 of fan input 22. As a result, stresses acting against output 18 of motor 16 and the motor itself as a result of rotation are greatly reduced, compared to if output 18 and input 22 were even slightly or marginally misaligned. The flexibility of member 46 also allows some limited relative axial movement or disposition between output 18 and input 22 without significantly stressing either component.

Figure 4:
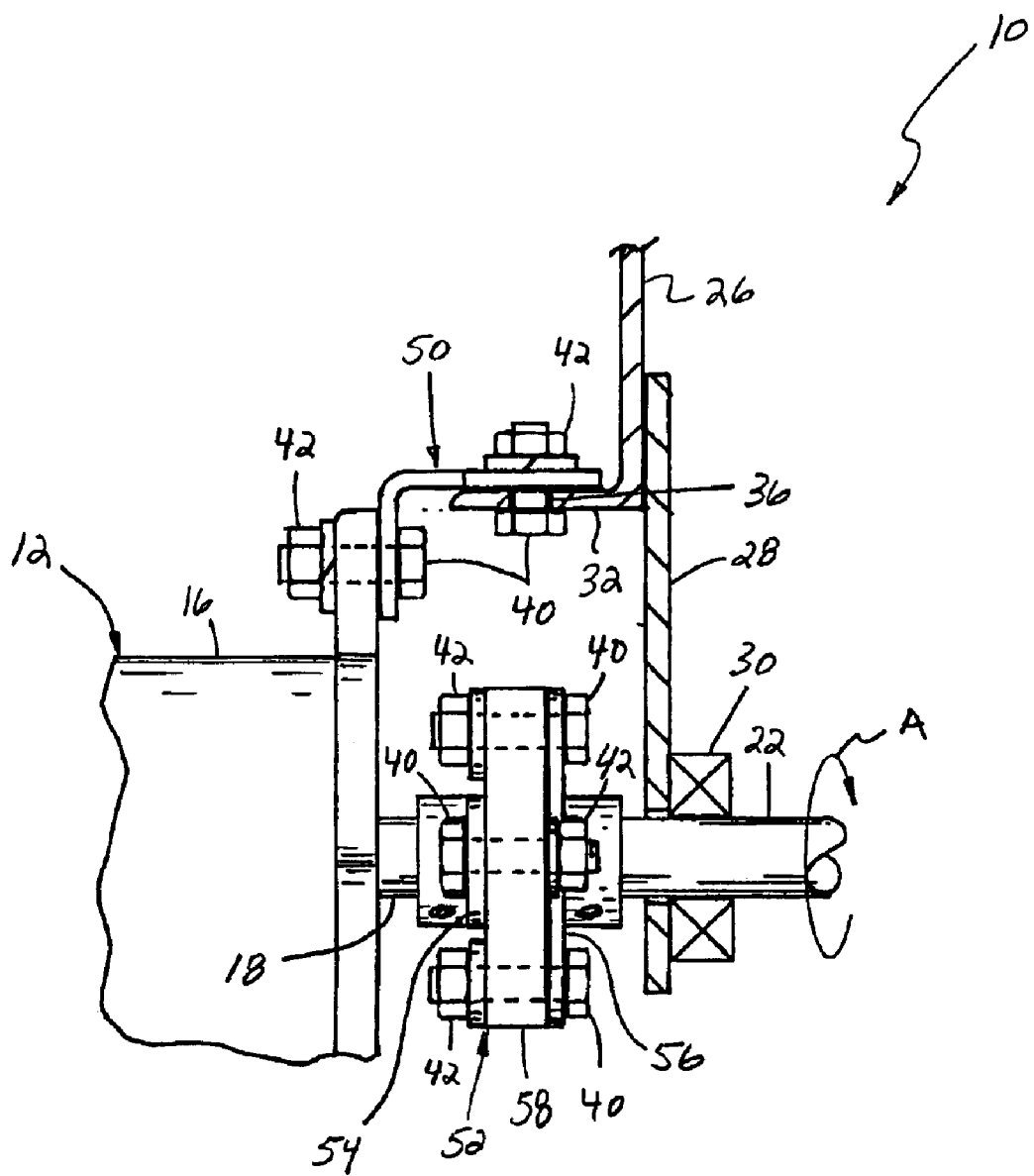
FIG. 4 is a fragmentary side view of another drive of the invention including a resiliently flexible member connecting the drive to a cleaning fan shaft.

Referring also to FIG. 4, drive 12 is shown mounted to flange 32 of frame member 26 of combine 10 by an L shape mounting element 50 held in place by bolts 40 through holes 36 in flange 32 and secured by nuts 42, again in cantilever relation. Fan shaft 22 is shown supported by and suspended from frame member 26 by bearing hanger bracket 28 and bearing 30, as before. Fan input 22 is rotatably drivingly connected to output 18 of motor 16 for rotation as denoted by arrow A, by a flexible coupling 52 of the invention having a first flange 54 connectable to output 18, and a second flange 56 connectable to fan shaft 22. A resiliently flexible elastomeric disk 58 is disposed between flanges 54 and 56 and is held in position by bolts 40 and nuts 42 which extend through the respective flanges 54 and 56 and disk 58. Coupling 52 allows output 18 and input 22 to be angularly misaligned and move axially one relative to the other by small amounts corresponding to anticipated manufacturing variances expected in the relative locations of mounting holes 36 and bearing 30 due to part tolerances, welding distortions and the like and also due to relative flexure of the components as a result of loading and movement during self-leveling, such that resulting stresses on motor 16, particularly output 18 and the seals therearound are significantly reduced. Mounting element 50 can also provide some flexibility so as to allow some additional limited relative axial movement or disposition between output 18 and input 22 without significantly stressing either component.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A drive for a cleaning fan supported by a frame member of an agricultural combine, the frame member including a mounting hole therein for the drive and the fan including an input rotatable about a first axis therethrough, the mounting hole being located within a range of positions relative to the axis, the drive comprising:

a motor including an output rotatable about a second axis therethrough, the output being connectable in rotatably driving relation to the input of the fan when the input and the output are in axial end-to-end relation to the input of the fan, the mounting element including a bracket mountable to the frame member, and an elongate, resiliently flexible elastomeric member having one end which connects to the bracket and another end that connects to the motor such that the resiliently flexible elastomeric member supports the motor, the flexible member having sufficient resiliently flexibility so as to accommodate the range of positions of the mounting hole relative to the axis of the input of the fan and to allow limited variations in relative angular orientation of the motor relative to the frame member for maintaining connection of the output of the motor in axially aligned relation to the input of the fan during rotation of the fan by the motor.

2. The drive of claim 1, wherein the output of the motor comprises a first shaft, and the input of the fan comprises a second shaft.

3. The drive of claim 1, wherein the resiliently flexible member has an elongate shape and extends longitudinally generally horizontally between the bracket and the motor.

4. The drive of claim 3, wherein the mounting element allows some limited movement between the motor and the frame member.

5. The drive of claim 1, wherein the frame member comprises a self-leveling frame member supported on the combine for pivotal movement relative thereto, and the mounting element when supporting the motor will allow movement of the motor relative to the frame member during the pivotal movement while maintaining the output of the motor in substantially axially aligned relation to the input of the fan.

6. The drive of claim 1, wherein the motor comprises a fluid motor, and the resiliently flexible member connects to a flange of the motor with a single fastener.

7. A drive for a cleaning fan supported by a frame member of an agricultural combine, comprising:

a motor including an output rotatable about a first axis therethrough, the output being connected in rotatably driving relation to an input of a cleaning fan rotatable about a second axis therethrough; and a mounting element mounting the motor to the frame member, the mounting element including a bracket connected to the frame member, the bracket including a dependent leg which extends downwardly from the frame member, and an elongate, resiliently flexible member having a first longitudinal end connected to the leg of the bracket such that the flexible member extends longitudinally horizontally therefrom, the resiliently flexible member having an opposite longitudinal end connected to the motor, the resiliently flexible member preventing rotation of the motor about the axes relative to the frame member while supporting and holding the motor such that the first axis will be substantially aligned with the second axis, the resilient flexibility of the mounting element allowing a limited amount of relative axial and angular movement of the motor relative to the frame member.

8. The drive of claim 7, wherein the output and the input each comprise a shaft, respectively.

9. The drive of claim 7, wherein the motor comprises a fluid motor, and the resiliently flexible member connects to a flange of the motor with a single fastener.

10. The drive of claim 7, wherein the resiliently flexible member extends longitudinally between the frame member and the motor transversely relative to the first and second axes.

11. The drive of claim 7, wherein the mounting element supports the motor in cantilever relation to the frame member.

12. The drive of claim 7, wherein the resiliently flexible member comprises an elastomeric material.

* * * * *